Feb. 10, 1953  J. M. MERGEN  2,627,927
PROPELLER TEMPERATURE CONTROL MEANS
Filed May 29, 1947  2 SHEETS—SHEET 1
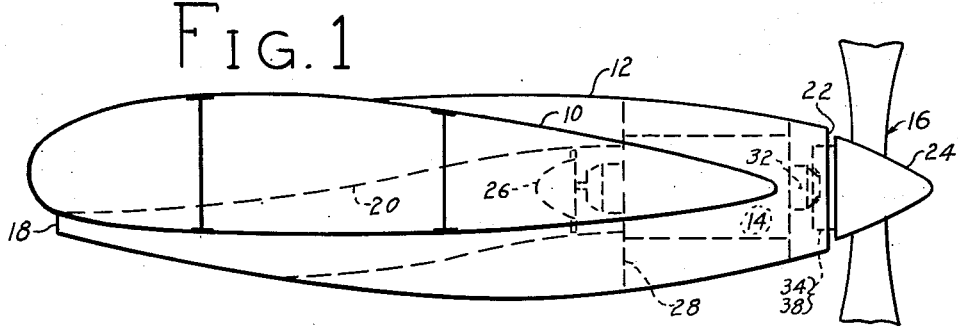
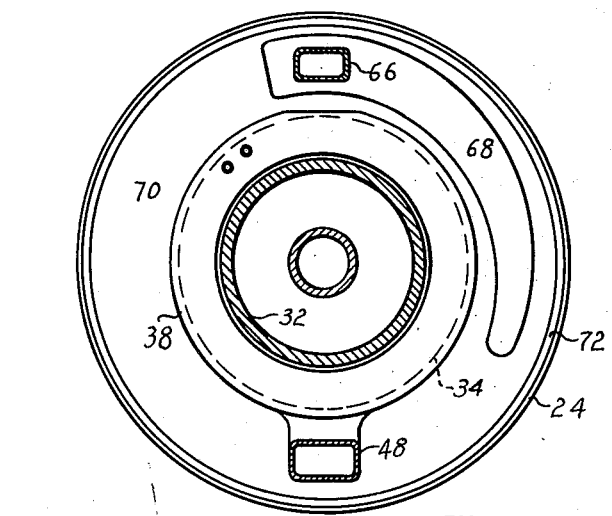
INVENTOR.
JOSEPH M. MERGEN
ATTORNEY.

Feb. 10, 1953  J. M. MERGEN  2,627,927
PROPELLER TEMPERATURE CONTROL MEANS
Filed May 29, 1947  2 SHEETS—SHEET 2

INVENTOR.
JOSEPH M. MERGEN
BY
ATTORNEY.

Patented Feb. 10, 1953

2,627,927

UNITED STATES PATENT OFFICE 2,627,927

PROPELLER TEMPERATURE CONTROL MEANS

Joseph M. Mergen, Verona, N. J., assignor to Curtiss-Wright Corporation, a corporation of Delaware Application May 29, 1947, Serial No. 751,477

8 Claims. (Cl. 170—135.743)

1

This invention relates to aeronautical power plants and is concerned particularly with means for controlling the temperature of a propeller and associated mechanism lying in the wake of hot gases discharged from a heat generating power plant.

Some aircraft power plant arrangements comprise an air cooled or air consuming engine which receives ambient air, raises its temperature and discharges heated air or gas rearwardly. When a propeller or other form of propulsive device is disposed in the wash or wake of said hot gases, its temperature is necessarily raised. While the temperature tolerance of a propeller or the like is considerable, some installations may cause the propeller mechanism to become so hot as to reduce propeller operating efficiency unless the propeller or mechanism is protected from the hot gas wash or wake. The propeller pitch changing mechanism incorporated in controllable pitch propellers normally is more sensitive to high temperatures than the propeller hub or blade per se.

It is an object of the present invention to provide means for inhibiting undue temperature rise in a propeller system which is disposed in an enveloping flow of hot gas. A further object consists in providing cooling means for a propeller when the latter is subject to undesired temperature rise. A further object of the invention is to control the flow of air to a propeller mechanism for cooling certain parts of the propeller and for heating other parts thereof. A further object, related to the next preceding, consists in providing a hot air heating system for the propeller blades to prevent propeller icing, and to provide an air cooling system for certain portions of the propeller not subject to icing, which may be overheated in operation. Another object is to provide a fluid temperature control system for a propeller, embodying the supply of either or both temperature controlled liquid or air to those portions of the propeller requiring temperature control. Still another object of the invention is to provide, in connection with a power plant which consumes air, a combination of conduits adapted to supply cool fluid to those power plant parts requiring it, and to supply hot fluid to other power plant components requiring it.

Further objects of the invention will become apparent in reading the annexed detailed description in connection with the drawings, the above objects being accomplished by the structure and arrangements set forth. It is to be expressly understood however, that the drawings and description are employed for purpose of illustration only and are not designed as a definition of the limits of the invention, reference being had to the appended claims for this purpose.

In the drawings in which similar reference characters designate similar parts,

Fig. 1 is a side elevation of a power plant nacelle associated with an aircraft wing and incorporating the invention;

Fig. 2 is an enlarged longitudinal section through the rearward portion of the nacelle, showing the power plant and propeller installation;

Fig. 4 is a section on the line 4—4 of Fig. 3.

Figure 3:
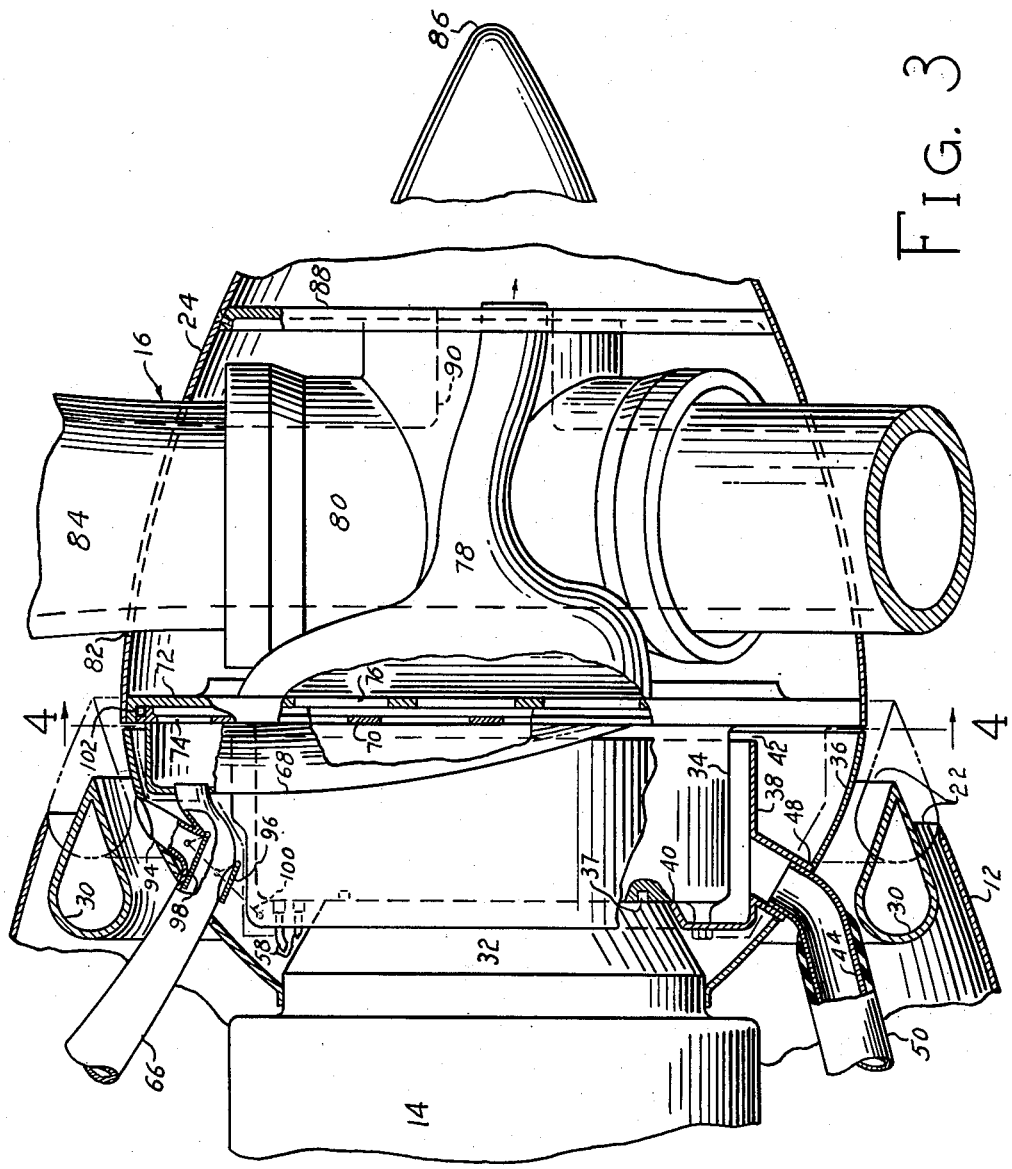
Fig. 3 is a longitudinal section through the most rearward part of the power plant nacelle and of portions of the propeller, enlarged, showing portions of the installation broken away.

The figures represent a single embodiment of the invention as applied to a pusher type power plant and propeller installation in an aircraft body associated with an aircraft wing. The wing is indicated at 10, and a nacelle 12 extends chordwise of the wing at an intermediate point in its span and projects rearwardly beyond the wing trailing edge, the after portion of the nacelle containing an engine 14 upon the rearward end of which a propeller 16 is drivably secured. The lower forward portion of the nacelle terminates in an air entrance opening 18 into which ambient air is rammed due to flight speed of the aircraft. This opening communicates with a rammed-air receiving air tunnel 20, disposed within the nacelle and leading to the forward end of the power plant 14 to supply air under pressure thereto for either or both cooling and power producing purposes. The air, after passing through the power plant 14, is discharged from the nacelle at an annular opening 22 between the nacelle rearward end and a streamlined propeller spinner 24 forming a substantial prolongation of the streamlined profile of the nacelle.

In Fig. 2, a cooling fan 26 is shown within the tunnel 20 to augment ram air pressure and flow of air to the outer portions of the forward end of the engine 14, there being a firewall 28 across the nacelle at the forward end of the engine. Ram air boosted by the fan 26 will be termed ram air in the following description. The engine itself, as is well known in the art, incorporates the necessary baffles and ducting by which the pressurized air is led to those parts of the engine which require it. In the arrangement shown, air passes from the engine into the cavity defined by that portion of the nacelle 12 rearward of the firewall 28, this air having been warmed by the transfer of heat resulting from engine operation. The warm air then passes through the exit annulus 22 and flow of air through said annulus is controlled by an axially movable ring plug 30. When the plug is moved rearwardly, the annulus 22 is diminished in area, restricting air flow; when it is moved forwardly, the effective area of the annulus 22 is increased to permit of increased air flow.

The rearward portions of the engine 14 and mechanism associated therewith are washed by the hot air within the rearward portion of the nacelle and are heated thereby. To provide more efficient flow of air out of the nacelle, the non-rotating rear end portion of the engine as at 32, and the non-rotating pitch changing mechanism portion 34 of the propeller 16 are masked by a spinner fairing 36 which guides air in streamlined fashion to the exit opening 22.

The propeller pitch changing mechanism 34 as shown in Fig. 3 is normally carried as a part of the propeller assembly but is secured from rotation by dowel engagement or the like, as at 37, on the rear flange of the normally hot engine portion 32. The portions 32 and 34, while being disposed within the confines of the fairing 36 which is ventilated, are still subject to hot air wash from the engine and thus ordinarily operate at high temperature. As to the propeller mechanism, operation at elevated temperatures is undesirable, for ordinarily, this mechanism includes lubricated gearing, hydraulic motors and the like. Since, as is well known, high temperatures tend to thin out oils and hydraulic fluids to a material extent, it is desirable to cool the propeller pitch changing mechanism housing 34 to allow operation of its components and fluids at nominal temperatures.

To this end, a shroud 38 of sheet metal or the like is arranged around the pitch changing mechanism 34, said shroud being sealed at its forward end against the mechanism, as at 40, and being spaced from the mechanism at its rearward end as at 42, the gap 42 providing an air exit opening as will shortly be described. A ram air duct 44 extends from an entrance scoop 46 in the tunnel 20 through the firewall 28 to a connection 48 on the shroud 38 whereby cool ram-pressure air is supplied to the interior of the shroud so that the entire pitch changing mechanism 34 is cooled and is isolated from the hot air or gas surrounding the shroud 38. Constant circulation of this cool air is maintained through the shroud since that air which enters the shroud may leave it by way of the gap 42 between the shroud and the pitch changing mechanism 34, there being a considerable pressure differential between the air in the duct 44 and the atmosphere at the exit gap 42. That air which escapes through the exit gap 42 passes into the space within the fairing 36 and passes to the outside atmosphere through the gap existing between the fixed fairing 36 and the rotating spinner 24. Preferably, since a large portion of the duct 44 extends through that zone of the nacelle which contains hot air or gas, said conduit is insulated as at 50 by an insulating lagging such as asbestos, glass tape or the like. Alternatively, the duct 44 may run through a larger conduit so that either dead air or moving cool air lies between the outer and inner conduits. Without such insulation, the ram air entering the scoop 46 would be subject to a considerable temperature rise in passing through the duct 44 in the rear portion of the nacelle 12 before it reaches the propeller mechanism cooling shroud 38.

As previously indicated, the propeller pitch changing mechanism 34 ordinarily embodies a fluid circulating system. The fluid in the system may be cooled independently of the air cooling of the exterior of the mechanism 34. To this end, a heat transfer unit or radiator 52 is installed within or adjacent the nacelle, the unit including an air scoop 54 deriving ram-pressure air from the tunnel 20 and exhausting it into a low pressure zone in the nacelle outside of the duct 20, as at 56. The fluid passages in the transfer unit 52 are connected by pipes 58 to suitable connections on the mechanism 34 whereby the circulating system within the mechanism 34 may enforce the travel of the fluid from the mechanism 34 to the transfer unit 52 and back again to the mechanism.

Thus, there is provided a dual cooling system for the propeller—a cool air wash for the mechanism proper on the one hand, and a liquid cooling system for the liquid contained in the propeller pitch changing mechanism on the other hand.

The cooling system above described may be incorporated in a propeller embodying a hot gas blade de-icing system, or other type of blade de-icing system. There is shown a hot gas de-icing system wherein ram-pressure air in the tunnel 20 is picked up by a scoop 60 whence it passes through a duct 62 around one or more of the exhaust pipes 64 of the engine 14, the air being heated by this passage and thence being conducted through a duct 66 to a distributor 68 secured to a non-rotatable disc 70 forming a part of the propeller mechanism. More than one set of elements 60, 62, 66 and 68 may be used if needed. Said disc at its periphery, sealingly engages a rotatable disc 72 secured to the propeller hub, the two discs having appropriate openings as at 74 and 76 to conduct hot gas from the conduit 66 and the distributor 68 to one or more ducts 78 mounted on and rotatable with the hub 80 of the propeller 16. The disc 72 forms a mounting for the forward end of the propeller spinner 24, said spinner having appropriate openings 82 therein to permit passage of the blades 84 of the propeller 16. The spinner continues rearwardly to a rearward closed end 86 and is further supported upon the propeller hub 80 by a diaphragm 88 which isolates a chamber in the rearward end of the spinner. The duct 78 passes through the diaphragm 88 and discharges its hot gas into the rear spinner chamber whence the hot gas passes into the hollow propeller hub as at 90 and thence outwardly into the hollow blades 84, the latter being provided with tip openings to allow of outflow of hot gas after that hot gas has warmed the blades to an extent sufficient to prevent the formation of ice thereon or to remove or melt ice from the blades after it may have formed.

In order to control the hot air de-icing gas fed to the propeller, the hot air duct 66 is provided with a by-pass 94 and with valves 96 and 98. The valve 98 serves to open and close the duct 66 with respect to the by-pass 94 while the valve 96, coincidentally operable with the valve 98 through a linkage 100, serves to admit air from within the chamber defined by the fairing 36 for passage into the distributor 68 and thence to the propeller. This valve arrangement allows of continuous flow of cool air over the engine exhaust manifolds 64 but also permits selective operation of propeller de-icing while maintaining a substantially uniform flow of air, regardless of its temperature, through the propeller. The primary purpose for providing continual flow of air through the propeller is to maintain a low pressure gradient across the seal 102 between the discs 70 and 72. If the air flow to the propeller were to be cut off, the seal would be placed under an augmented pressure differential due to the pumping action of the blades which tend to induce air flow therethrough by the action of centrifugal force.

It is to be understood that the hot gas anti-icing system herein described and shown, and the propeller pitch changing mechanism cooling system described and shown, may be used either singly or in combination with one another. It is to be further understood that the cooling system for the propeller pitch changing mechanism may be extended to provide cooling for the entire propeller hub assembly should such entire cooling be deemed desirable.

It is to be understood that the cooling system for the propeller hub mechanism may be applied to a propeller subject to any kind of hot gas wake or wash. For instance, a pusher propeller in a gas turbine installation as distinguished from a reciprocating internal combustion engine installation is clearly capable of incorporating the provisions of the invention without departing from the spirit or scope thereof. Similar non-limiting scope applies in the specification with regard to the teachings concerning hot gas de-icing of the propeller.

As inferred previously, the particular forms of mechanism herein described are not to be considered as limiting the scope of the invention. For instance, the arrangement of ducting, shrouding, and baffling may take many and various forms in accordance with the design requirements encountered in any particular aircraft design problem. The description encompasses aircraft bodies of any sort, as well as nacelles, and the relationship of the wings thereto is not material.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In an aircraft heat generating power plant including a pusher controllable pitch propeller having its own pitch changing mechanism in the wake of the power plant and subject to the wash of hot gas from the power plant, in combination, a shroud embracing said pitch changing mechanism in closely spaced relation thereto, a duct leading from a point upstream of said power plant into said shroud to conduct cool air thereto for intimate contact with said mechanism, means for exhausting shroud cooling air from said shroud, and a streamlined hollow cowling embracing the propeller pitch changing mechanism and shroud over which said hot gas passes, the hollow of said cowling providing a substantially dead air space between said shroud and cowling.

2. In an aircraft controllable pitch propeller installation, said propeller having a pitch changing mechanism subject to extraneous heating and embodying a circulating fluid system, a fluid cooler, connections between said cooler and mechanism for leading fluid from said mechanism to said cooler and from said cooler to said mechanism, and means to wash said cooler with cool air to reduce the temperature of the fluid in said cooler.

3. In an aircraft controllable pitch propeller installation, said propeller having a pitch changing mechanism subject to extraneous heating and embodying a circulating oil system, an oil cooler, connections between said cooler and mechanism for leading oil from said mechanism to said cooler and from said cooler to said mechanism, and means to wash said cooler with cool air to reduce the temperature of the oil in said cooler.

4. In an aircraft power plant having the characteristic of producing a hot gas wake, a propeller incorporating a pitch changing mechanism lying in said hot gas wake, a cooling jacket closely embracing said mechanism, a streamline cowling embracing the mechanism and the jacket forming therewith a substantially dead air space and over which cowling said gas wake flows smoothly, and means to direct coolant to and within said jacket for heat exchanging contact with the interior of said jacket and with said mechanism.

5. In an aircraft power plant having the characteristic of producing a hot gas wake, a propeller incorporating a pitch changing mechanism lying in said hot gas wake, a cooling system for said mechanism comprising means to direct cool air over and around said mechanism, and an oil circulating system for the propeller, independent of the rest of the power plant within said mechanism having an external oil cooler in circuit therewith.

6. In an aircraft power plant having the characteristic of producing a hot gas wake, a propeller incorporating a pitch changing mechanism lying in said hot gas wake, means to direct cool air over and around said mechanism to overcome the heating effect of said wake on said mechanism, and a cooling system for said mechanism comprising an oil circulating system in and for said mechanism alone, an external oil cooler disposed in a cool air stream, and connections between said oil cooler and circulating system.

7. In an aircraft pusher power plant installation comprising a cowled-in engine and an air supplying system therefor exhausting rearwardly of the engine and substantially coaxially therewith as a hot gas wake, a pusher controllable propeller driven by said engine and disposed rearwardly thereof and in the path of exhausting air, said propeller having associated therewith a pitch changing mechanism, a streamlined cowling around the mechanism and over which said wake flows smoothly, a shroud closely enclosing said mechanism and disposed within said cowling, and a cool air duct having an inlet in a zone of said aircraft whereat cool air under pressure exists, said duct leading to and connecting with said shroud for feeding cool air through said shroud and around said mechanism in heat exchange relation with the interior of said shroud and with said mechanism.

8. In an aircraft pusher power plant installation comprising a cowled-in engine and an air supply system therefor exhausting rearwardly of the engine and substantially coaxially therewith as a hot gas wake, a pusher controllable propeller driven by said engine and disposed rearwardly thereof and in the path of exhausting air, said propeller having associated therewith a pitch changing mechanism, a shroud enclosing said mechanism and isolating said mechanism from contact with said exhausting air, a cool air duct having an inlet in a zone of said aircraft whereat cool air under pressure exists, said duct leading to and connecting with said shroud for feeding cool air through said shroud and around said mechanism in heat exchange relation with the interior of said shroud and with said mechanism, an oil cooler in said aircraft, an oil circulating system in and for said mechanism alone, and connections for carrying oil between said cooler and mechanism.

JOSEPH M. MERGEN.

REFERENCES CITED

The following references are of record in the file of this patent:

UNITED STATES PATENTS

| Number | Name | Date |
|---|---|---|
| 1,386,493 | Guyot | Aug. 2, 1921 |
| 2,118,654 | Meijer | May 24, 1938 |
| 2,403,797 | Hersey | July 9, 1946 |
| 2,426,635 | Mercier | Sept. 2, 1947 |
| 2,434,319 | Kalitinsky | Jan. 13, 1948 |
| 2,435,168 | Suggs | Jan. 27, 1948 |
| 2,488,783 | Stalker | Nov. 22, 1949 |

FOREIGN PATENTS

| Number | Country | Date |
|---|---|---|
| 588,096 | Great Britain | May 14, 1947 |

OTHER REFERENCES

Publication "S. A. E. Journal," May 1934, pages 147–165. (Copy in Division 28.)

Hamilton Standard Propellers Service Manual No. 160, August 15, 1946.

Erection and Maintainance Manual for B–29 Aircraft. (Copy in Division 22, U. S. Patent Office.)